Figure 1:
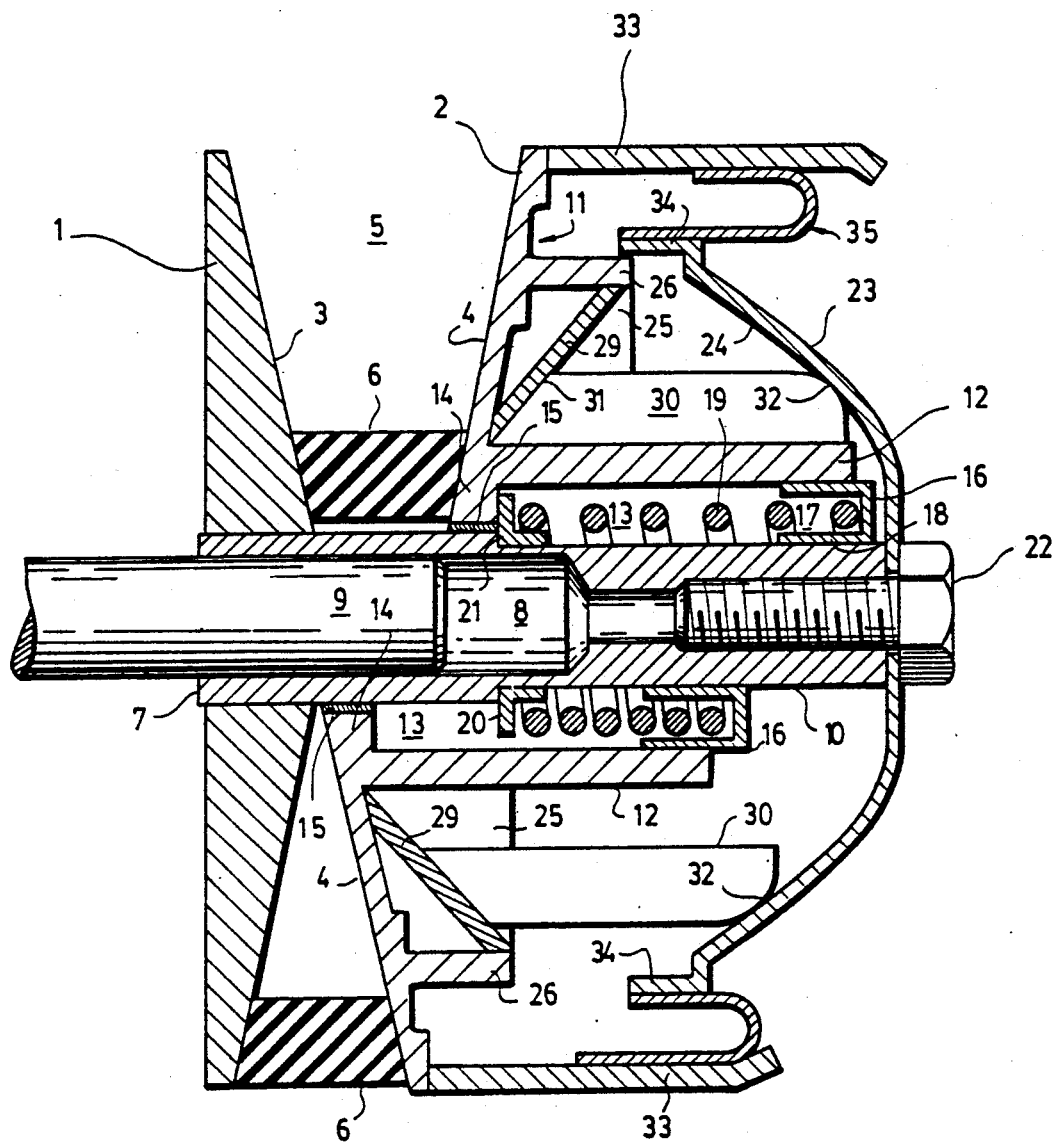

United States Patent [19]
Gourdon

[11] Patent Number: 5,108,347
[45] Date of Patent: Apr. 28, 1992

[54] SPEED VARIATOR PULLEY PROVIDED WITH A TRANSMISSION MEMBRANE

[75] Inventor: Eric Gourdon, Treize Vents, France

[73] Assignee: Powerbloc IBC Canada Inc., Drummondville, Canada

[21] Appl. No.: 642,450

[22] Filed: Jan. 17, 1991

[30] Foreign Application Priority Data

Jan. 18, 1990 [FR] France .................. 90 00471

[51] Int. Cl.⁵ .............................. F16H 61/00
[52] U.S. Cl. .............................................. 474/13
[58] Field of Search ........................... 474/11-13, 474/17, 18, 69, 70

[56] References Cited

U.S. PATENT DOCUMENTS

| | | | |
|---|---|---|---|
| 3,230,787 | 1/1966 | Siegal | 474/13 X |
| 3,659,470 | 5/1972 | Beaudoin | 474/13 |
| 4,515,575 | 5/1985 | Kinbara et al. | 474/13 |
| 4,608,030 | 8/1986 | deBriel | 474/13 |

FOREIGN PATENT DOCUMENTS 1212550 10/1986 Canada .
2504635 10/1982 France .

*Primary Examiner*—Thuy M. Bui
*Attorney, Agent, or Firm*—Foley & Lardner

[57] ABSTRACT

A driving pulley of a variable speed transmission having a drive shaft and two coaxial cheeks facing one another and defining a v-shaped groove which receives a trapezoidal belt. One of the cheeks is axially movable relative to the other cheek and has two housings distributed around its axis. The housings have a linear oblique ramp secured thereto and side wings which act as radial translation guides for inertia blocks which bear against the ramps and against a reaction cup attached to a hub of the driving pulley. The movable cheek is made solid in rotation with the drive shaft by a rubber membrane having a bow shape which is connected to the reaction cup. As the drive shaft rotates, the inertia blocks are subject to centrifugal forces which cause the movable cheek to move toward the other cheek. A return spring provides a force opposing the movement of the movable cheek.

2 Claims, 2 Drawing Sheets

SPEED VARIATOR PULLEY PROVIDED WITH A TRANSMISSION MEMBRANE

The invention relates to a speed variator provided with a transmission membrane and used, namely, in a variable speed transmission of the V-shaped pulley and trapezoidal-shaped belt type. Transmissions of this type are, for example, used in snow scooters, motorcycles, utilitarian or pleasure vehicles, or license-free cars or cars of the TQM type.

They generally comprise a driving pulley solid with a drive shaft and a follower pulley driven in rotation by a belt mounted in grooves of the two pulleys. The driving pulley is made such that the winding diameter of the belt varies automatically as a function of the speed of rotation of the pulley. The belt having a fixed length, the driven pulley has a winding diameter which varies in reversed direction to that of the driving pulley. Under the combined effect of these two variations, the ratio of the rotation speeds of the two pulleys is modified according to the changes in diameter of the driving pulley.

Examples of driving pulleys of the abovementioned type are described in patents FR-A 2,504,835 and CA-A-1,212,559.

They comprise, in general, two coaxial cheeks having truncated sidewalls facing one another and forming between them a V-shaped groove. A cheek, hereinafter called fixed cheek, is secured in rotation and in translation on the drive shaft of the pulley and the other, called the movable cheek, is able to slide axially on the same shaft. There is provided, behind the movable cheek, an oblique ramp of which the surface turned toward the axis of the shaft faces a second oblique ramp of a reaction cup solid with the drive shaft of the pulley. Inertia blocks provided in housings of the movable cheek and in housings of the reaction cup are able to move radially and are guided, in this movement, by the side wings of these housings.

When the shaft of the pulley rotates, it drives the fixed cheek and the reaction cup into rotation. The reaction cup transmits its rotational movement, through the side wings of its housings, to the inertia blocks which in turn drive, through the side wings of the housings of the movable cheek, the said movable cheek. On the other hand, because they rotate, the inertia blocks are subjected to the action of centrifugal forces and, moving radially, respectively bear against the two ramps of the movable cheek and of the reaction cup. Because of their trapezoidal shape, they exert an axial thrust on the movable cheek which then slides toward the fixed cheek. For a given rotation speed of the pulley, an equilibrium is reached when the axial thrust is counterbalanced by an axial return force inserted by a return spring mounted between the movable cheek and a shoulder of the pulley shaft. According to this equilibrium, the winding diameter of the trapezoidal belt takes on a greater or lesser value according to the speed of rotation of the pulley.

In dynamics, when the speed of rotation increases, the centrifugal forces on the inertia blocks increase proportionately. The axial thrust of the latter on the ramps likewise increases and the equilibrium is displaced toward closing in of the two cheeks. Thus the winding diameter of the belt increases. In reverse, when the speed decreases, the axial thrust of the inertia blocks decreases and the equilibrium is displaced toward moving away of the two cheeks. The winding diameter of the belt then decreases.

In fact, through the contact of each of the inertia blocks with the corresponding ramps and with the side wings of the housings that receive them, radial friction forces are created which oppose the radial movement of the inertia blocks as well as axial friction forces which oppose the axial movement of the movable cheek. These axial forces give rise to a hysteresis effect in the operation of the pulley. Indeed, when the speed increases, the movable cheek moves toward the fixed cheek. The axial reaction forces oppose this movement of the movable cheek and substract themselves to the axial thrust exerted by the inertia blocks. The equilibrium is therefore displaced toward a lesser closing in of the two cheeks and the winding diameter is thus smaller than that it should be without these friction forces. On the other hand, when the speed of rotation decreases, the movable cheek is displaced by moving away from the fixed cheek. The axial friction forces which oppose this movement therefore tend, in this case, to hold the two cheeks close to one another. The winding diameter is therefore greater than that it should be without these friction forces.

In the prior art devices, the hysteresis effect is important because the axial reaction forces are large. Indeed, in order to bring the movable cheek into rotation, means are provided such as the side wings of the housings described above. Now, such means are in general constituted by several parts which slide relative to one another and are, because of this, the seat of friction forces of which the values are sufficiently high to contribute, in a significant manner, to this hysteresis effect.

It will be noted that a transmission of which the driving pulley presents too important an hysteresis effect decreases the performances of vehicles provided with such a transmission.

An object of the invention is therefore to propose means capable of driving the movable cheek of a driving pulley, this driving pulley then offering, because of these means, a minimized hysteresis effect.

For this purpose, the invention concerns a driving pulley of a variable speed transmission of which the follower pulley is driven by a belt having a trapezoidal cross-section connecting it to the driving pulley; said driving pulley comprising two coaxial cheeks having truncated sidewalls facing one another to define a V-shaped groove between them in which the trapezoidal belt is mounted; one of the cheeks, called the fixed cheek, is secured on one end of a hub solid with a drive shaft of the driving pulley and the other cheek, called the movable cheek, is slidably movable axially on the said hub; a reaction cup is secured on the other end of the hub, said reaction cup being constituted by a disk bent over toward the axis along an appropriate curvature, the inner surface of the cup being turned toward the two cheeks; said movable cheek has, uniformly distributed around its axis, housings in each one of which a linear oblique ramp is secured of which the surface turned toward the axis faces the inner surface of the reaction cup and each of which housings has side wings constituting radial translation guides for inertia blocks bearing, on the one hand, against each of the ramps of the housings of the movable cheek and, on the other hand, bearing against the inner surface of the reaction cup; the inertia blocks being subjected, when the drive shaft of the pulley rotates, to centrifugal forces which cause the movable cheek to be displaced toward the fixed cheek, a return spring being provided to exert a force opposing closing in of the two cheeks.

According to one feature of the invention, the movable cheek is made solid in rotation with the drive shaft by means of a rubber membrane which connects it to the reaction cup by comprising a portion of a revolution of which the cross-section has the shape of a bow.

According to another feature of the invention, the membrane is secured by one of its faces on the inner wall of an annular body at the periphery of the movable cheek and extending it in a direction opposite its truncated sidewall and, by the same face, on an annular part at the periphery of the reaction cup, the membrane having a cross-section, in a radial plane, in the form of an inverted "C".

According to another feature of the invention, the membrane is secured by one of its faces on the inner wall of an annular body at the periphery of the movable cheek and extending it in a direction opposite its truncated sidewall and, by the same face, on an annular part at the periphery of the reaction cup, the membrane having a cross-section, in a radial plane, in the form of a "C".

Figure 2:
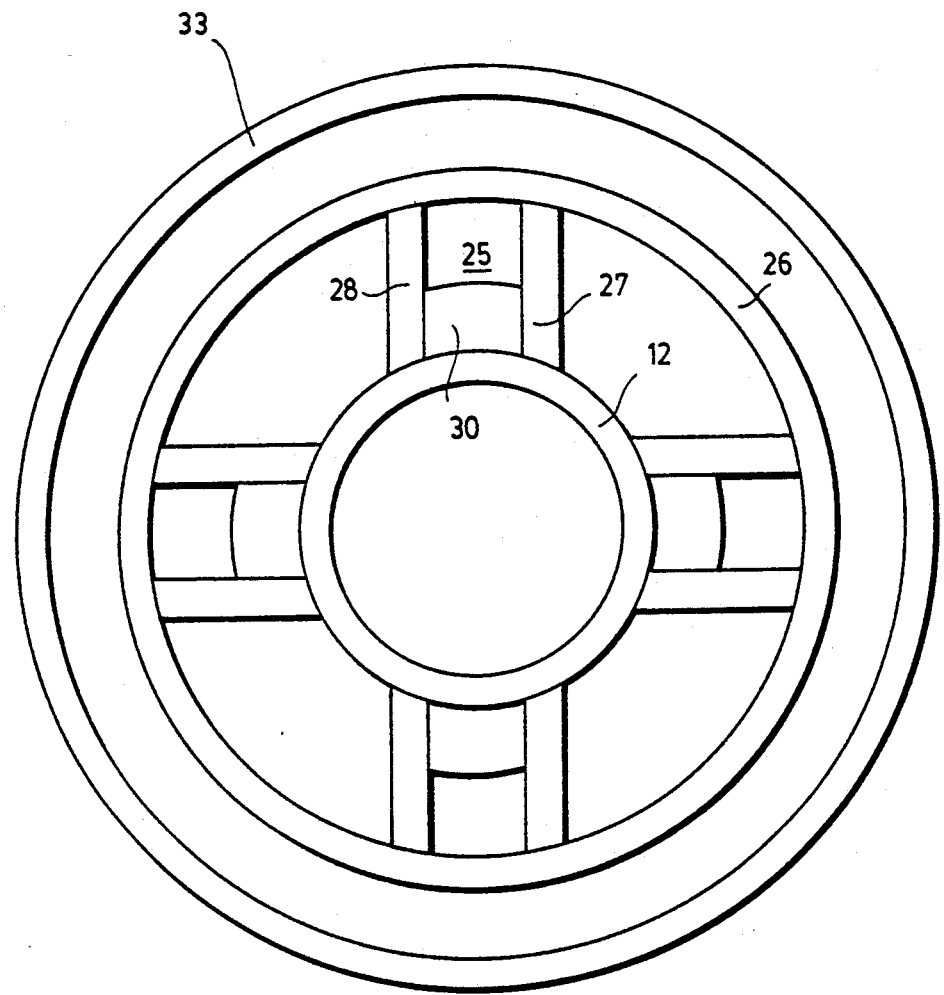

The features of the invention mentioned above, as well as others, would appear more clearly from reading of the description that follows of an embodiment, the said description being made in connection with the appended drawings wherein:

FIG. 1 is a cross-sectional view of a driving pulley of a variable speed transmission according to the invention, the upper part of this view illustrating a first extreme state of equilibrium of the pulley and the lower part a second extreme state of equilibrium, and FIG. 2 is an axial view of the face of a movable cheek opposed to that of its truncated face.

A driving pulley of an automatic speed variation transmission according to the invention comprises two coaxial cheeks 1, 2 of which the truncated sidewalls 3, 4 face one another to define a V-shaped groove 5 between them. A trapezoidal reaction belt 6 is placed in the groove for transmitting the torque to a not shown follower pully. The cheek 1 is coaxially secured to one end of a hub 7 having an axial bore 8 in which is force-fitted the end of a drive shaft 9. Means (not shown) such as a key or the conical end of the shaft 9, may be provided to increase the anti-rotation grip of the hub 7 on the drive shaft 9. The hub is divided into two cylindrical parts, 7, 10, the part 7 facing the drive shaft and having a diameter greater than the other hub part 10. According to another embodiment, the two parts 7, 10 have the same diameter.

Starting from its face 11, opposed to that of its truncated sidewall 4, the cheek 2 is extended axially by an annular body 12 defining a blind hole 13 of which the bottom wall 14 is in the extension of the truncated sidewall 4. The wall 14 is formed with an axial hole in which is force-fitted a bearing 15 of which the inner diameter is equal, give or take the clearance, to the diameter of the cylindrical part 7 of the hub. The bearing 15 is made of a material having a small coefficient of friction.

At the end of the annular body 12 where the blind hole 13 opens and on its inner diameter is mounted a ring 16 formed with a blind hole 17 of which the inside is turned toward the blind hole 13. Moving from the bottom wall of the hole 17, in the direction of the hole 13, is a cylindrical sleeve 18 having an axial bore of which the diameter is equal, give or take the clearance, to the outer diameter of the cylindrical part 10 of the hub 7. Around the sleeve 18 is a helicoidal return spring 19 of which a first turn bears against the bottom wall of the blind hole 16 and the turn of the opposite end bears against a small cup 20. The latter is held by the return spring 19 against a shoulder 21 formed at the intersection of the two cylindrical parts 7, 10 of the hub.

If, according to a variant of this embodiment, the diameters of the parts 7, 10 are equal, the cup 20 is thrusted against a circlip (not shown) which is mounted at the intersection of the two parts.

At the end of the hub 7 opposite that which receives the cheek 1 is secured, by means of a screw 22, a reaction cup 23. Means, not shown, may be provided to improve the anti-rotation grip of the reaction cup on the hub 7, such as pins, ribs, flats, etc. The reaction cup 23 is made up of a disk of which the peripheral portion is turned toward the axis according to an appropriate curvature. The inner surface of the reaction cup 23 forms an axially facing concave ramp 24.

Housings 25 are provided on the back of the cheek 2. They are uniformly distributed around the annular body 12 and are, for example, four in number. They are, on the other hand, defined radially by the annular body 12 and by an annular concentric flange 26 having a diameter greater than the annular body 12 and, on the other hand, laterally by side wings 27, 28 grouped in pairs. The wings 27, 28 of each pair are parallel between them and are spaced equally on either side of a radial plane. In each of these housings 25 is secured a linear ramp 29 which is inclined with respect to the axis of the pulley. Ramp 29 has its face turned toward the axis and also turned toward the outside of the cheek 2. Each of the housings 25 receives an inertia block 30 of which the width is equal, give or take the clearance, to the distance that separates the wings 27, 28 of each pair. In the longitudinal direction, each inertia block 30 has an elongated shape with, at a first end, an inclined wall 31 having the same obliquity with respect to the axis of the pulley as the ramp 29 and, at the other end, a rounded wall 32. Each inertia block is thus designed to slide radially in the corresponding housing 25 of the cheek 2 and is guided by the side wings 27, 28. It is also provided to be driven into rotation by the cheek 2 by means of the same wings 27, 28. The rounded shape of wall 32 is such that each inertia block 30 bears against the inner surface 24 of the reaction cup 23 by one point only.

At the periphery of the cheek 2 and on its side which is opposite its truncated sidewall 4 is secured an annular body of which the length is about equal to that of the annular body 12. The reaction cup 23 is formed at its periphery with an annular part 34 turned toward the cheek 2. A membrane 35, secured by one of its faces against the inner wall of the annular body 33, starts from this inner wall while moving away from the cheek 2, is bent and comes against the outer wall of the annular part 34 of the reaction cup 23 where it is secured by the same face. The means securing the membrane may, for instance, be made up, with respect to the connection between the membrane 35 and the annular body 33, of screws spread over the circumference of the body 33 and threaded into the membrane 35 and, with respect to the connection between the membrane 35 and the annular part 34, of a clip forcing the membrane 35 against the reaction cup 23. The connections of the membrane 35 with the annular body 33 and with the annular part 34 must be sufficiently rigid to transmit the driving torque from the reaction cup 23 to the movable cheek 2. The membrane 35 has, in a radial plane, an inverted "C" shape. Each wing of this "C" may slide axially one with respect to the other with a minimum of force corresponding to the bending resistance of the material of the membrane to bend. On the other hand, the bowed zone of the membrane offers an important resistance to their sliding in rotation, one with respect to the other.

In order to offer these mechanical features, the membrane is made of a rubber which may be, for instance, of the EPDM or silicone type, etc.

The operation of the illustrated pulley is as follows.

The hub 7 being solid with the drive shaft 9, it rotates at the same speed. In its rotational movement, it drives the cheek 1 and the reaction cup 23. Through the membrane 35, the reaction cup 23 drives the cheek 2 which then rotates at the speed of the assembly and the side wings 27, 28 of the housings 25 drive the inertia blocks 30 into rotation.

At a given rotation speed of the drive shaft 9, the inertia blocks 30 are subjected to centrifugal forces which make them move radially against the ramps 24, 29. Due to the obliqueness of the wall 31 of each inertia block 30, of the rounded shape of the opposite wall 33, of the inclination of the ramp 29 and of the shape of the ramp 24 of the reaction cup 23, these centrifugal forces have axial components which act on each of the ramps 24, 29. The reaction cup 23 being axially fixed with respect to the hub 7, these components are reduced to an axial thrust on the ramp 29 and, therefore, on the cheek 2. It follows that, being free to slide on the cylindrical hub 7, the cheek 2 is displaced axially toward the stationary cheek 1, which causes compression of the spring 19 which then develops a return force essentially proportional to its elongation. At a certain speed of rotation, this return force has the same amplitude, but is in opposite direction, as the axial thrust exerted by the inertia blocks 30. These two forces therefore cancel each other and a static equilibrium is reached between the two cheeks 1, 2. The winding diameter of the trapezoidal belt 6, inserted in the groove 5 formed by the two cheeks 1, 2, takes on a value which is large or small depending on this state of equilibrium.

FIG. 1 shows, in half cross-sections, the two extreme states of equilibrium of a driving pulley according to the invention.

In dynamics, when the speed of rotation increases, the centrifugal forces acting on the inertia blocks 30 increase proportionately. The axial thrust of the latter on the ramps 24, 29 increases equally and the equilibrium is displaced toward closing in of the two cheeks 1, 2. The winding diameter of the belt 6 consequently increases. In reverse, when the speed decreases, the axial thrust of the inertia blocks 30 decreases and the equilibrium is displaced toward spreading apart of the two cheeks 1, 2. The winding diameter of the belt 6 consequently decreases.

In fact, at the contact of each of the inertia blocks 30 with the corresponding ramps 24, 29, friction forces develop which oppose the radial movement of the inertia blocks 30 and the axial displacement of the movable cheek 2. Similarly, the latter slides over the hub 7 while generating friction forces which oppose its axial displacement. The membrane 36 likewise opposes the axial movement of the movable cheek 2.

These axial forces generate a hysteresis effect in the operation of the pulley. Indeed, when the speed increases, the cheek 2 moves toward the cheek 1. The axial resistive forces oppose this movement and substract it to the axial thrust exerted by the inertia blocks 30. The equilibrium is therefore displaced toward a lesser closing in of the two cheeks 1, 2, and the winding diameter is consequently smaller than what it should be without these friction forces. On the other hand, when the rotation speed decreases, the movable cheek 2 is shifted by moving away from the fixed cheek 1. The friction forces which oppose this movement then tend, in this case, to hold the two cheeks 1, 2, close together. The winding diameter is therefore greater than what it should be without these friction forces.

The greater the axial reaction forces, the greater the hysteresis effect. Now, in the pulley according to the invention, these axial reaction forces are minimized. Indeed, the contact of the inertia blocks 30 with the reaction cup 23 is punctual. There, the friction forces are weak. The movable cheek 2 slides over the bearings 15 having a small coefficient of friction. And the membrane 35 develops a small axial reaction in order to bend.

In the prior art devices, the means used to ensure the transmission of the rotation movement of the reaction cup (or of the drive shaft) to the movable cheek are a source of important axial friction forces. In comparison with such means, the use of a membrane such as the one provided on a driving pulley according to the invention offers a definite advantage as it ensures transmission of the driving torque of the reaction cup to the movable cheek while lowering the hysteresis effect.

I claim:

1. A driving pulley, having a drive shaft, of a variable speed transmission of which the follower pulley is driven by a belt having a trapezoidal cross-section connecting the belt to the driving pulley; said driving pulley comprising: two coaxial cheeks having truncated sidewalls facing one another to define a V-shaped groove therebetween in which the trapezoidal belt is mounted; one of the cheeks, called the fixed cheek, is secured on one end of a hub solid with the drive shaft of the driving pulley, and the other cheek, called the movable cheek, is slidably movable axially on said hub; a reaction cup having an inner surface is secured on the other end of the hub, said reaction cup comprising a disk bent toward a longitudinal axis of the driving pulley along an appropriate curvature, the inner surface of the reaction cup being turned toward the two cheeks; the movable cheek having, uniformly distributed around its axis, housings in each one of which a linear oblique ramp is secured, the ramps having a surface turned toward the longitudinal axis of the driving pulley and facing the inner surface of the reaction cup, each of the housings having side wings constituting radial translation guides for inertia blocks bearing, on the one hand, against each of the ramps of the housings of the movable cheek and, on the other hand, bearing against the inner surface of the reaction cup; the inertia blocks being subjected, when the drive shaft of the driving pulley rotates, to centrifugal forces which cause the movable cheek to be displaced toward the fixed cheek; and a return spring being provided to exert a force opposing closing in of the two cheeks, wherein the movable cheek is made solid in rotation with the drive shaft by means of a rubber membrane which connects it to the reaction cup by having a portion of a revolution of which the cross-section has the shape of a bow.

2. A pulley according to claim 1, further comprising an annular body, having an inner wall, connected to the periphery of the movable cheek thereby extending the movable cheek in a direction opposite its truncated sidewall, wherein the membrane has a face secured to the annular body inner wall, the reaction cup has an annular part at the periphery thereof secured to the membrane face, and the membrane has a cross-section, in a radial plane, in the form of an inverted C.

* * * * *